United States Patent [19]

St. Angelo, Jr. et al.

[11] Patent Number: 5,129,134
[45] Date of Patent: * Jul. 14, 1992

[54] HOLDING ARM FIXTURE FOR USE IN CONJUNCTION WITH A ROBOT FOR INSTALLING WEATHER STRIPPING IN A DOOR OR LIKE OPENING

[75] Inventors: Stephen St. Angelo, Jr., Rochester Hills, Mich.; Alan Heads, New Market, Canada

[73] Assignee: General Motors Corporation, Detroit, Mich.

[*] Notice: The portion of the term of this patent subsequent to Jul. 14, 2007 has been disclaimed.

[21] Appl. No.: 305,428

[22] Filed: Feb. 1, 1989

[51] Int. Cl.⁵ .................. B25J 19/00; B25H 5/00; B25B 29/00
[52] U.S. Cl. .................. 29/281.1; 29/281.6; 29/235; 29/450; 29/DIG. 104; 901/50
[58] Field of Search .............. 29/235, 450, 451, 509, 29/701, 281.1, 281.6, 721, 771, DIG. 104; 198/617; 414/744.1, 744.2, 744.3; 901/50

[56] References Cited

U.S. PATENT DOCUMENTS

| | | | |
|---|---|---|---|
| 4,620,354 | 11/1986 | Hess et al. | 29/235 X |
| 4,715,110 | 12/1987 | St. Angelo et al. | 29/235 X |
| 4,843,701 | 7/1989 | St. Angelo et al. | 29/235 |
| 5,029,381 | 7/1991 | St. Angelo, Jr. et al. | 29/701 |
| 5,031,293 | 7/1991 | Goedderz et al. | 29/235 |

Primary Examiner—Joseph M. Gorski
Assistant Examiner—Peter Dungba Vo
Attorney, Agent, or Firm—Ernest E. Helms

[57] ABSTRACT

The present invention provides a holding fixture which is best utilized when installing a closed loop fixed length of weather stripping. The fixture as provided improves a robot weather stripping system by decreasing the rate of unacceptable applications and decreasing the criticality of the weather stripping parameters by holding the weather stripping in a unique manner during installation.

1 Claim, 2 Drawing Sheets

HOLDING ARM FIXTURE FOR USE IN CONJUNCTION WITH A ROBOT FOR INSTALLING WEATHER STRIPPING IN A DOOR OR LIKE OPENING

FIELD OF THE INVENTION

The field of the present invention is that of a holding fixture which aids in the installation of weather stripping into a door or like opening when utilizing a robot for such installation. The present invention can be utilized in conjunction with the robotic weather stripping systems as shown and described in commonly assigned St. Angleo et al. U.S. Pat. Nos. 4,715,110; 4,760,636; 4,780,943 and 5,029,381. The disclosures of the aforementioned patents and patent application are incorporated herein.

SUMMARY OF THE INVENTION

The present invention provides a holding fixture which is best utilized when installing a closed loop fixed length of weather stripping. The fixture as provided improves a robot weather stripping system by decreasing the rate of unacceptable applications and decreasing the criticality of the weather stripping parameters.

It is an object of the present invention to provide a fixture for utilization with a robot for installing weather stripping into a body or like opening.

It is an object of the present invention to provide a holding fixture used in conjunction with a robot having a arm with a powered pressured roller attached at the end of the arm for installing a closed loop fixed length of weather stripping into a body opening, the fixtures including stand means generally laterally offset from the body opening, a spring biased pivot arm pivotally connected with the stand means and projecting therefrom, the pivot arm projecting into the fixed length holding a portion of the fixed length in a position laterally offset from the opening upon the initial installment of the fixed length into the body opening by the robot arm, a spring biased finger pivotally connected to an end of the pivot arm opposite the pivotal connection of the pivot arm with the stand means whereby the finger prevents the escapement of the fixed length from the fixture upon pivotal movement of the pivot arm caused by the installation of the fixed length within the body opening, and the finger holding the fixed length laterally from the body opening and tensioning the fixed length as the robot arm pressure roller further installs the weather stripping during the later stages of installation of the fixed length into the body opening and whereby the finger pivots during the last stages of the fixed length installation in the opening to allow the fixed length to escape from the fixture allowing the robot to complete the installation of the fixed length into the body opening.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
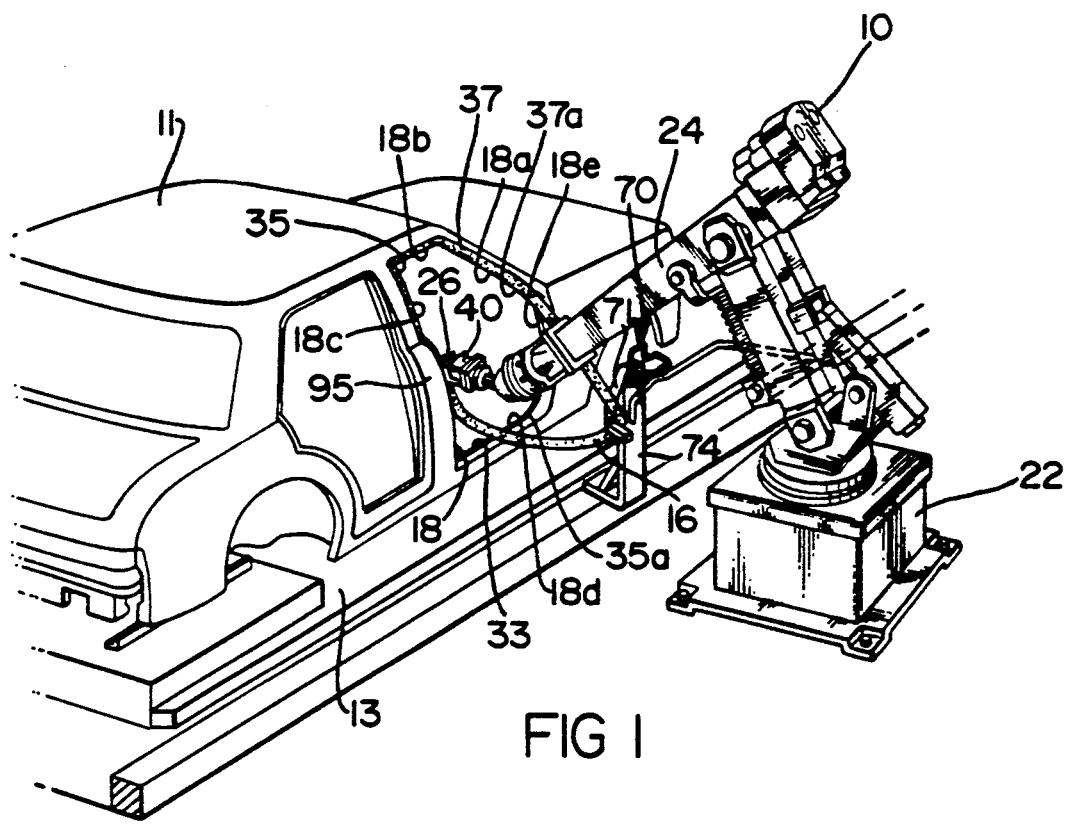
FIG. 1 is a perspective view of a preferred embodiment fixture of the present invention being utilized in the environment of an automotive assembly plant wherein a robot is being utilized to install a closed loop fixed length of weather stripping into a door opening.
Figure 2:
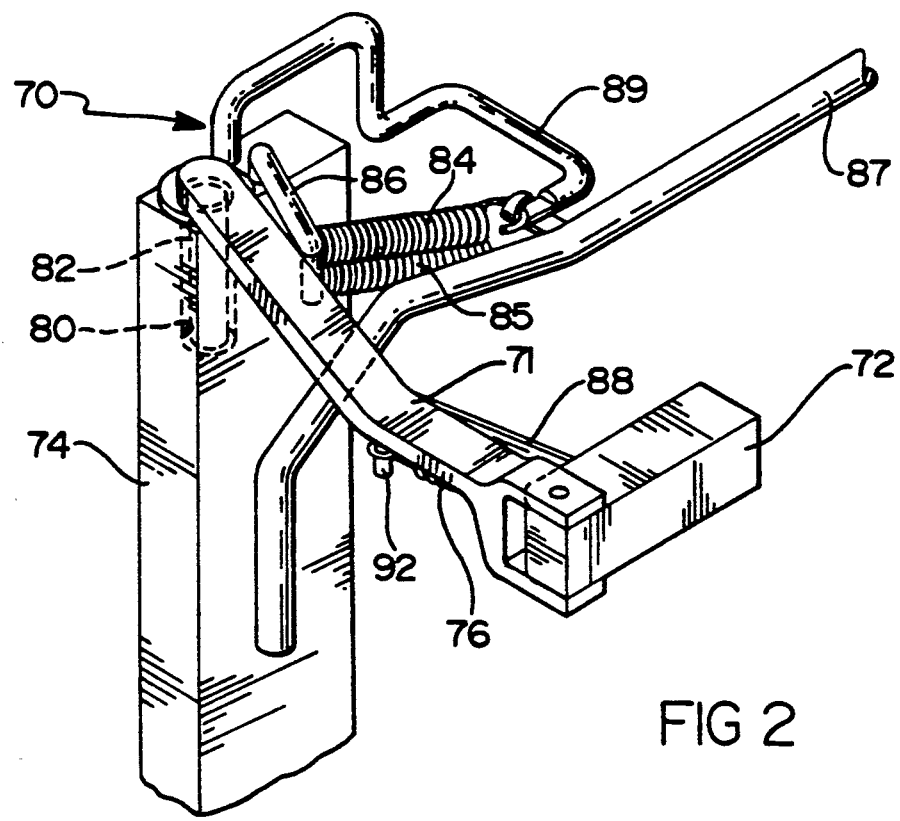
FIG. 2 is an enlarged perspective view of the fixture.
Figure 3:
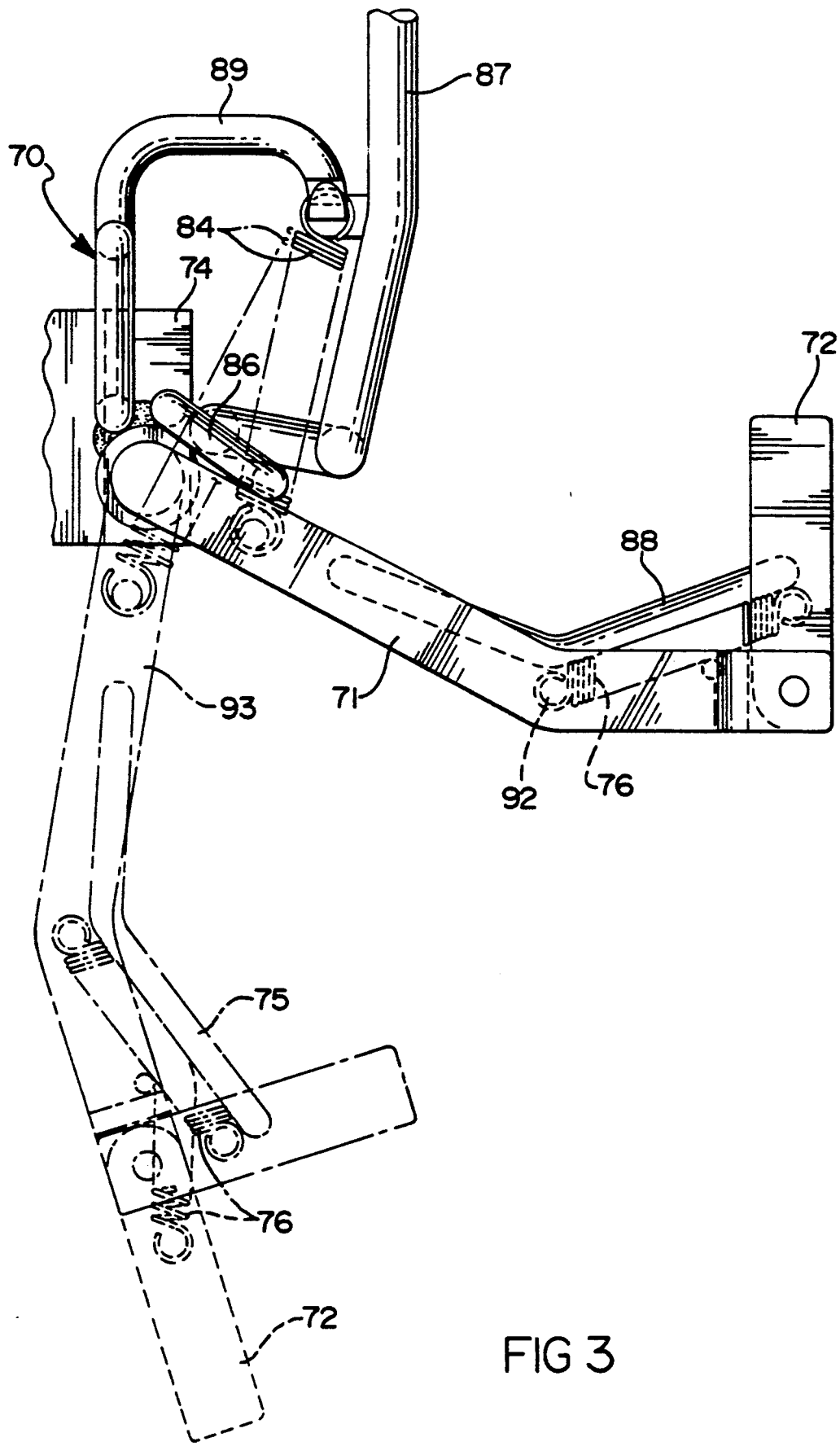
FIG. 3 is a top plane view of the fixture illustrated in FIG. 2 with a phantom view demonstrating operation of the fixture during installation of the weather stripping.

Referring to FIGS. 1, 2, and 3 a six axes robot 10 is located adjacent the side of a vehicle body 11. The vehicle 11 is moved along a conveyer line on an automatic guided vehicle 13. The robot 10 will install the weather stripping 16 by interacting with vehicle door 18 to affix the weather stripping 16 therein. The weather stripping 16 utilized is a fixed length closed loop which has a carrier section, not shown, for affixing to the pinch weld flange of the door opening 18.

The robot 10 pivots on a pedestal 22 and has an arm 24 movable in both vertical and horizontal plane for universal movement. At the end of the arm 24 is an end of arm tool device (EOAT) 40 with a powered pressure roller 26 which allows the robot 10 to affix the weather stripping 16 to the opening 18.

The opening 18 of the door has generally straight sections 35 along with joining corners 33 defining a main plane. The present invention provides a holding fixture 70 is used with conjunction with the robot 10. The holding fixture 70 has a stand means 74 which extends generally parallel to the main plane and is laterally offset therefrom. As shown in the environment of FIG. 1 the stand 74 is typically also slightly forward of the door opening. Pivotally connected to the stand means is a pivot arm 71. The pivot arm 71 has a stud 82 which fits into well 80 of the stand, allowing the pivot arm 71 to pop out from the stand 74 upon a malfunction of the robot 10 or the holding fixture 70.

A formed rail 89 mounts a first spring 84 which angularly biases the pivot arm 71 against an angular stop 86. Another first spring 85, which is connected to a optional guide rail 87, which is in turn connected with stand 74 and the floor, also spring biases the pivot arm 71 in like manner. A finger 72 is connected to an end of the pivot arm 71 opposite the pivotal connection of the pivot arm 71 with the stand 74. A second spring 76 connected to the finger 72 and to a pin 92 mounted to the pivot arm 71, angularly biases the finger 72 against the end edge of the pivot arm 1.

Although installation of the weather stripping can begin anywhere typically it will began on the A pillar 37 of the vehicle. As illustrated, installation has began at a point at approximately 37A. Contemporaneously at the beginning of installation or just prior thereto the loop of the weather stripping 16 will be positioned such that the pivot arm 71 is positioned within the loop. The optional guide rail 87 will urge the weather stripping into the correct orientation and keep the weather stripping 16 from contacting the springs 85, 84.

Upon initial installment the weather stripping 16 will generally contact the pivot arm 71 along its main beam 93. As installation continues up the A pillar 37 (Section 18A) to an area of the opening 18B along the roof section, the nonapplied portion of the weather stripping 16 will generally be in a slackened unconstrained condition. (This can vary with the location of the stand 74 and the length of the weather stripping 16.) However, as installation continues to proceed down the B pillar 95 along sections 18C of the opening the slack in the weather stripping will be taken up, and the weather stripping will pull on the first arm 71. Springs 84 and 85 are generally exert a very light force, therefore, the pivot arm 71 will tend to pivot with respect to the stand 74. As the pivot arm pivots with respect to the stand 74 the weather stripping 16 will slide along the main beam 93.

During the later stages of installation on the B pillar 95, the weather stripping 16 will slide along a guide beam 75 until it makes contact with the finger 72. The guide beam 75 also prevents contact between the weather stripping 16 and the spring 76. The finger 72 will prevent the escapement of the loop of weather stripping 16 from the fixture 70 upon the pivotal movement of the pivot arm 71. However, as installation of the weather stripping 16 continues the weather stripping 16 will further pull on the finger 72. Spring 76 of the finger 72 is relatively stiff spring, therefore, it tensions the weather stripping 16 as installation begins on the latest stages of installation along section 18D along the floor of the opening 18. Since spring 76 is relatively stiff, the weather stripping 16 at this point will be relatively tensioned a greater amount than in the other stages of installation. The tensioning of the weather stripping 16 provides a significant benefit since the weather stripping now has it open carrier end pointed downward causing the weather stripping to be laterally more unstable. Lateral instability of the weather stripping 16 can sometimes create a tendency of the weather stripping 16 to come out of engagement with the EOAT 40 of the robot. The reason for this tendency is described in more detail in the U.S. Pat. No. 5,029,381. By tensioning the weather stripping 16 the weather stripping has greater lateral stability, therefore, there is less of a tendency of the weather stripping 16 to come out of engagement with the end of arm tool 40 during this last stage of engagement.

As installation continues the tension in the loop of the weather stripping 16 will overcome the biasing force of spring 76. The finger 72 will then extend and allow the weather stripping 16 to escape. The robot 10 will complete installation of the weather stripping into the opening 18 along section 18E. The spring 76 bends around a pin 97 projecting downward from the main beam 93. The locations of pins 92 and 97 are such that the spring 76 is overcentered when extended and will therefore always return the finger 72 to its proper location upon release of the weather stripping 16.

Still another benefit of the holding fixture 70 is that by holding the weather stripping laterally of the opening 18 it aids the elimination the tendency of the weather stripping 16 to get crimped up in corner 35A by preventing the weather stripping 16 from going inboard of the opening 18 during the installation (this tendency especially occurs when the weather stripping does not have the proper torsional rigidity).

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A holding fixture used in conjunction with a robot having an arm with a powered pressured roller attached at an end of said arm for installing a closed loop fixed length of weather stripping into a body opening, said fixtures in combination comprising:

stand means generally laterally offset from said body opening;

a pivot arm pivotally connected with said stand means and projecting therefrom, said pivot arm projecting into said fixed length holding a portion of said fixed length in a position laterally offset from said opening upon an initial installment of said fixed length into said body opening by said robot arm;

a first spring means biasing said pivot arm;

a finger pivotally connected to an end of said pivot arm opposite said pivotal connection of said pivot arm with said stand means whereby said finger prevents the escapement of said fixed length from said fixture upon pivotal movement of said pivot arm caused by the installation of said fixed length within said body opening, and said finger holding said fixed length laterally from said body opening and tensioning said fixed length as said robot arm pressure roller further installs said weather stripping during latter stages of said fixed length installation in said opening to allow said fixed length to escape from said fixture allowing said robot to complete the installation of said fixed length into said body opening; and a second spring means biasing said finger.

* * * * *